US011691356B2

(12) United States Patent
McCullough et al.

(10) Patent No.: US 11,691,356 B2
(45) Date of Patent: Jul. 4, 2023

(54) SYSTEM AND METHOD FOR FORMING STACKED MATERIALS

(71) Applicant: General Electric Company, Schenectady, NY (US)

(72) Inventors: Chrishauna Nicole McCullough, Augusta, GA (US); Nolan Leander Cousineau, West Chester, OH (US); Simeon Paul Copple, Wilmington, OH (US); Patrick Wayne Hollingsworth, North East, MD (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/169,623

(22) Filed: Feb. 8, 2021

(65) Prior Publication Data

US 2022/0250339 A1    Aug. 11, 2022

(51) Int. Cl.
| | |
|---|---|
| *B29C 70/56* | (2006.01) |
| *B29C 70/34* | (2006.01) |
| *B33Y 80/00* | (2015.01) |
| *B29C 43/12* | (2006.01) |
| *B29C 43/36* | (2006.01) |

(52) U.S. Cl.
CPC ............ *B29C 70/342* (2013.01); *B29C 70/56* (2013.01); *B29C 43/12* (2013.01); *B29C 2043/3655* (2013.01); *B33Y 80/00* (2014.12)

(58) Field of Classification Search
CPC ....... B29C 70/342; B29C 70/56; B29C 43/10; B29C 2043/3655; B29C 33/50
See application file for complete search history.

(56) References Cited

U.S. PATENT DOCUMENTS

| | | | |
|---|---|---|---|
| 2,246,116 A | * | 6/1941 | Wagner .................. B64C 21/08 244/216 |
| 4,034,054 A | | 7/1977 | Sauer |
| 5,037,599 A | | 8/1991 | Olson |
| 5,151,277 A | * | 9/1992 | Bernardon ............ B29C 70/443 249/161 |
| 5,152,949 A | | 10/1992 | Leoni et al. |
| 5,173,314 A | | 12/1992 | Hosoi |
| 5,236,646 A | | 8/1993 | Cochran et al. |
| 5,427,518 A | | 6/1995 | Morizot et al. |

(Continued)

FOREIGN PATENT DOCUMENTS

| | | |
|---|---|---|
| CN | 101489768 A | 7/2009 |
| CN | 101835583 A | 9/2010 |

(Continued)

OTHER PUBLICATIONS

Smiley et al., Analysis of the Diaphragm Forming of Continuous Fiber Reinforced Thermoplastics, Journal of Thermoplastic Composite Materials, vol. 1, Issue 4, Oct. 1988, pp. 298-321.

*Primary Examiner* — Matthew J Daniels

(74) *Attorney, Agent, or Firm* — Dority & Manning, P.A.

(57) ABSTRACT

An intensifier mechanism for forming stacked material includes a support, a first body coupled to the support, and a second body having a main portion, a pivoting portion, and a joint. The main portion is coupled to the support and the joint movably couples the main portion to the pivoting portion. The joint allows the pivoting portion to pivot in relation to the main portion when the membrane moves towards the bottom wall.

8 Claims, 8 Drawing Sheets

(56) References Cited

U.S. PATENT DOCUMENTS

| | | |
|---|---|---|
| 5,648,109 A | 7/1997 | Gutowski et al. |
| 6,017,484 A | 1/2000 | Hale |
| 6,146,576 A | 11/2000 | Blackmore |
| 6,270,603 B1 | 8/2001 | Westerman et al. |
| 6,484,776 B1 | 11/2002 | Meilunas et al. |
| 6,607,684 B1* | 8/2003 | Lee .................. B29C 45/14467 264/250 |
| 7,588,711 B2 | 9/2009 | Depase et al. |
| 7,758,786 B2 | 7/2010 | Nemchick et al. |
| 8,142,181 B2 | 3/2012 | Willden et al. |
| 8,162,652 B2 | 4/2012 | Marengo et al. |
| 8,303,761 B2 | 11/2012 | Inserra Imparato et al. |
| 8,557,165 B2 | 10/2013 | Jones et al. |
| 8,585,952 B2 | 11/2013 | Packer et al. |
| 8,628,709 B2 | 1/2014 | Blot et al. |
| 9,862,122 B2 | 1/2018 | Santiago et al. |
| 9,868,237 B2 | 1/2018 | Filsinger et al. |
| 2004/0102136 A1* | 5/2004 | Wood .................. B25J 17/0275 451/5 |
| 2004/0222562 A1 | 11/2004 | Kirchner |
| 2009/0084493 A1 | 4/2009 | Westerdahl et al. |
| 2009/0091052 A1* | 4/2009 | Pridie .................... B29C 70/54 425/149 |
| 2009/0197050 A1 | 8/2009 | Pridie |
| 2010/0181017 A1* | 7/2010 | Shinoda .................. B29C 33/04 156/583.1 |
| 2010/0193115 A1 | 8/2010 | Inserra Imparato et al. |
| 2010/0263789 A1* | 10/2010 | Graber .................... B29C 70/56 156/228 |
| 2010/0310818 A1* | 12/2010 | Pridie ................. B29C 43/3642 428/114 |
| 2011/0259515 A1 | 10/2011 | Rotter et al. |
| 2012/0018089 A1 | 1/2012 | Gueret et al. |
| 2013/0341816 A1 | 12/2013 | Bergmann |
| 2015/0158211 A1* | 6/2015 | Gensewich ............. B29C 70/44 425/388 |
| 2016/0031164 A1 | 2/2016 | Downs et al. |
| 2016/0121560 A1* | 5/2016 | Lee ....................... B29C 70/549 425/504 |
| 2016/0375675 A1 | 12/2016 | Pham |
| 2017/0072647 A1 | 3/2017 | Perrillat et al. |
| 2017/0252982 A1 | 9/2017 | Knutson |
| 2017/0341278 A1* | 11/2017 | Shair ....................... B29C 43/20 |
| 2017/0341310 A1 | 11/2017 | Thattai Parthasarathy et al. |
| 2018/0297298 A1* | 10/2018 | Marquez ................. B29C 70/44 |
| 2019/0016039 A1* | 1/2019 | Drees ..................... B29C 70/44 |

FOREIGN PATENT DOCUMENTS

| | | |
|---|---|---|
| CN | 104441697 A | 3/2015 |
| EP | 0369207 B1 | 5/1990 |
| EP | 0659541 B1 | 4/1998 |
| EP | 2334486 B1 | 12/2012 |
| EP | 2561978 A2 | 2/2013 |
| EP | 3067182 A1 | 9/2016 |
| FR | 2689809 A1 | 10/1993 |
| JP | S63144037 A | 6/1988 |
| JP | 10507697 A | 7/1998 |
| JP | 2002/248694 A | 9/2002 |
| JP | 2004/294113 A | 10/2004 |
| JP | 2006/123404 A | 5/2006 |
| JP | 2007/260925 A | 10/2007 |
| JP | 2014/504566 A | 2/2014 |
| JP | 2015/104895 A | 6/2015 |
| WO | WO9605386 A1 | 2/1996 |
| WO | WO2009/044194 A2 | 4/2009 |

* cited by examiner

SYSTEM AND METHOD FOR FORMING STACKED MATERIALS

BACKGROUND

The field of the disclosure relates generally to systems for forming stacked materials and, more particularly, to systems that include membranes to facilitate forming stacked materials.

At least some known systems are used to form stacked materials into composite laminate components. The stacked materials include a plurality of layers or plies of composite material that provide the composite laminate component with improved engineering properties. For example, the stacked materials include layers of any of the following materials: prepregs, dry fabrics, carbon fabrics, tackified fabrics, release films, backing paper, vacuum films, liners, membranes, carbon fiber, glass, polymeric fibers such as polyimides and polyethylenes, ceramic matrix composites, silicon carbide, and alumina. In at least some systems, the stacked material is positioned adjacent to a tool and forced against the tool to shape the stacked material into the component shape. In some systems, a membrane is used to facilitate shaping the stacked material. The membrane is extended over the stacked material and/or tool and positioned in a controlled manner to cause the tool to shape the stacked material.

In at least some known systems, the tool has complex geometries, such as overhangs, undercuts, concave surfaces, and convex surfaces. However, the membrane bridges over these complex geometries and does not cause the stacked material to be adequately compacted. As a result, the stacked material is sometimes not properly formed adjacent to these complex geometries. Therefore, additional processing, such as debulking, may be required to properly form the stacked material into the desired component.

BRIEF DESCRIPTION

In one aspect, a system for forming stacked material is provided. The system includes a housing defining an interior space. The housing includes a bottom wall and a side wall coupled to the bottom wall. At least one tool is configured to shape the stacked material. The at least one tool is disposed within the interior space. A membrane extends at least partially over the bottom wall and is spaced a distance from the bottom wall. The membrane is configured to move towards the bottom wall. At least one intensifier mechanism is disposed in the interior space and is configured to induce a force against a portion of the stacked material and against the at least one tool as the membrane is moved towards the bottom wall. The intensifier mechanism includes a support, a first body coupled to the support, and a second body having a main portion, a pivoting portion, and a joint. The main portion is coupled to the support, the joint movably couples the main portion to the pivoting portion. The joint is configured to allow the pivoting portion to pivot in relation to the main portion when the membrane moves towards the bottom wall.

In another aspect, an intensifier mechanism for forming stacked material is provided. The intensifier mechanism includes a support, a first body coupled to the support, and a second body having a main portion, a pivoting portion, and a joint. The main portion is coupled to the support, the joint movably couples the main portion to the pivoting portion. The joint is configured to allow the pivoting portion to pivot in relation to the main portion when the membrane moves towards the bottom wall.

In yet another aspect, a method of forming stacked material is provided. The method includes placing stacked material between a tool disposed in an interior space of a housing and a membrane and placing an intensifier mechanism between the stacked material and the membrane. The intensifier mechanism includes a support, a first body coupled to the support, and a second body having a main portion, a pivoting portion, and a joint. The main portion is coupled to the support, the joint movably couples the main portion to the pivoting portion. The method further includes moving the membrane towards the tool, which causes the pivoting portion to pivot in relation to the main portion, which compresses the stacked material at predetermined locations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DRAWINGS

These and other features, aspects, and advantages of the present disclosure will become better understood when the following detailed description is read with reference to the accompanying drawings in which like characters represent like parts throughout the drawings, wherein.

Figure 1:
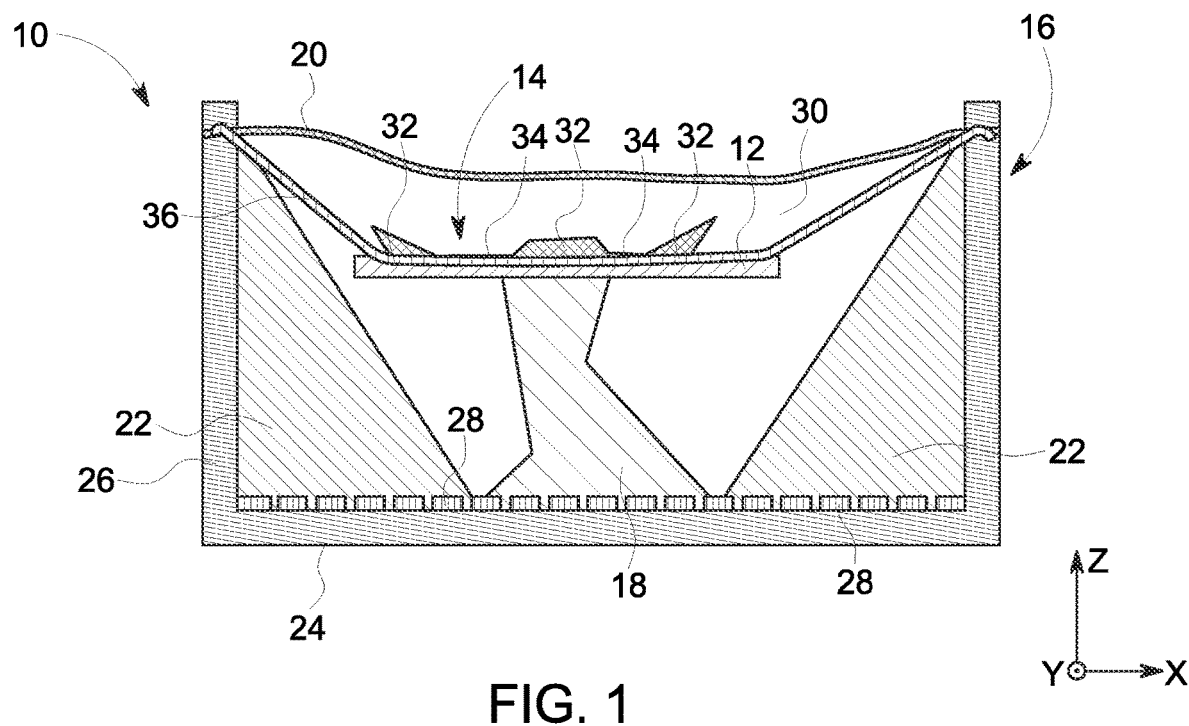
FIG. 1 is a schematic side view of an exemplary system for forming stacked material, according to one example embodiment.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The systems described herein include a membrane to facilitate forming stacked material into a component. The system includes a housing defining an interior space and a tool disposed in the interior space. The membrane is moved in the interior space towards the tool. In some embodiments, at least one insert is disposed in the interior space to control movement of the membrane, reduce stretching of the membrane, and provide a controlled movement of the membrane. In further embodiments, at least one intensifier mechanism is disposed in the interior space to facilitate shaping the stacked material with the tool. The at least one intensifier mechanism is configured to cause the tool to shape the component into complex geometries. In some embodiments, the at least one intensifier mechanism provides contact pressure between the stacked material and the tool for increased compaction of the stacked material.

Figure 2:
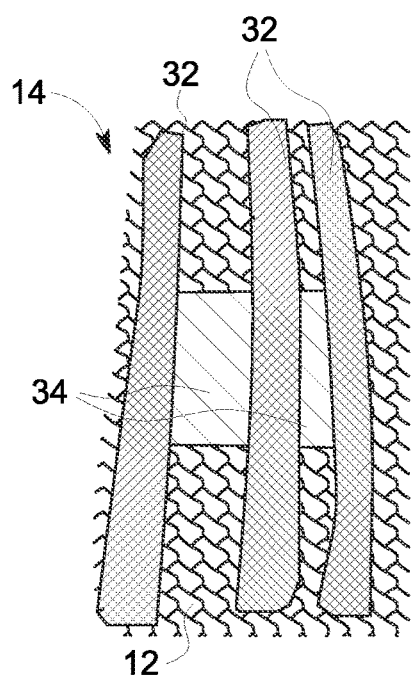
FIG. 2 is a schematic top view of an intensifier mechanism, according to one example embodiment.

FIG. 1 is a schematic side view of a system 10 for forming stacked material 12 including an intensifier mechanism 14, according to one example. FIG. 1 includes an X-axis, a Y-axis, and a Z-axis for reference during the following description. FIG. 2 is a schematic top view of intensifier mechanism 14, according to one example. System 10 includes intensifier mechanism 14, a housing 16, a tool 18, a membrane 20, and inserts 22. Housing 16 includes a bottom wall 24, a side wall 26 coupled to bottom wall 24, and a perforated plate 28 disposed on bottom wall 24. Housing 16 defines an interior space 30. In alternative embodiments, system 10 has any configuration that enables system 10 to operate as described herein. For example, in some embodiments, tool 18, inserts 22, and/or housing 16 are integrally formed.

In the exemplary embodiment, stacked material 12 includes a plurality of layers or plies of composite material. In alternative embodiments, stacked material 12 includes any layers that enable system 10 to operate as described herein. For example, in some embodiments, stacked material 12 includes layers of any of the following materials, without limitation: prepregs, dry fabrics, carbon fabrics, tackified fabrics, release films, backing paper, vacuum films, liners, membranes, carbon fiber, glass, polymeric fibers such as polyimides and polyethylenes, ceramic matrix composites, silicon carbide, and alumina.

During operation of system 10, a negative pressure is generated in interior space 30 such that membrane 20 is drawn towards bottom wall 24. As membrane 20 moves towards bottom wall 24, membrane 20 contacts stacked material 12, tool 18, side wall 26, inserts 22, and intensifier mechanism 14. Intensifier mechanism 14 is positioned on stacked material 12 adjacent tool 18 such that intensifier mechanism 14 induces a force in stacked material 12 as membrane 20 moves towards bottom wall 24. Intensifier mechanism 14 can be configured to move in directions along the X-axis, Z-axis, and Y-axis such that intensifier mechanism 14 contacts stacked material 12 at predetermined locations. In particular, intensifier mechanism 14 induces a force against portions of stacked material 12 adjacent complex geometries on tool 18 to facilitate tool 18 shaping stacked material 12.

In some embodiments, intensifier mechanism 14 is coupled to stacked material 12 at fixed positions. In other embodiments, intensifier mechanism 14 is loosely positioned on stacked material 12. In alternative embodiments, intensifier mechanism 14 is coupled to any of housing 16, tool 18, and membrane 20. For example, in some embodiments, intensifier mechanism 14 extends beyond stacked material 12 and couples to tool 18. In further embodiments, at least a portion of intensifier mechanism 14 is fixed to tool 18. In still further embodiments, intensifier mechanism 14 is integral with tool 18. In some embodiments, intensifier mechanism 14 is removably coupled to tool 18.

In the exemplary embodiment, intensifier mechanism 14 is disposed in interior space 30 and includes bodies 32 and support 34. Each body 32 has a shape that corresponds to a desired shape of a component formed from stacked material 12 and engages a portion of tool 18. Support 34 extends between bodies 32 and is coupled to bodies 32 such that bodies 32 are movable in relation to housing 16. In particular, bodies 32 and support 34 are movably coupled together such that at least a portion of bodies 32 pivots about support 34. Accordingly, support 34 forms a hinge. In some embodiments, each support 34 and/or bodies 32 includes any number of segments, including one, that enable system 10 to operate as described herein. In the exemplary embodiment, support 34 includes two segments coupled to bodies 32 at positions that facilitate bodies 32 inducing forces in stacked material 12 at precise locations. In further embodiments, support 34 includes a plurality of segments extending between the same bodies 32. In some embodiments, support 34 extends the full length of intensifier mechanism 14. In some embodiments, support 34 is a unitary component that is coupled to a plurality of bodies 32. In alternative embodiments, intensifier mechanism 14 has any configuration that enables system 10 to operate as described herein. For example, in some embodiments, intensifier mechanism 14 is formed as a single integrated component. In further embodiments, intensifier mechanism 14 includes at least one body 32 embedded in support 34. In still further embodiments, intensifier mechanism 14 includes at least one body 32 and support 34 is omitted.

Also, in the exemplary embodiment, intensifier mechanism 14 is made from materials that facilitate the positioning of intensifier mechanism 14 during operation of system 10. For example, support 34 is made from a material that is flexible to enable bodies 32 to move and has some rigidity to maintain proper positioning of intensifier mechanism 14 in relation to stacked material 12. For example, support 34 could be made from a spring steel, such as blue tempered spring steel.

Moreover, intensifier mechanism 14 is made from materials that withstand relatively high temperatures. For example, support 34 and bodies 32 remain sufficiently rigid to retain their shape when system 10 is heated. In alternative embodiments, intensifier mechanism 14 is made of any materials that enable system 10 to operate as described herein. For example, in some embodiments, intensifier mechanism 14 is made from materials that are compatible with stacked material 12, e.g., materials that do not contaminate stacked material 12 when intensifier mechanism 14 directly contacts stacked material 12. In further embodiments, bodies 32 are made from semi-rigid materials. For example, in some embodiments, bodies 32 include any of the following materials: silicone, rubber, semi-rigid plastic, and combinations thereof. To name a few examples, bodies 32 can be made from polyetherimide, polyaryletherketone, aluminum alloy, or alloy steel.

Intensifier mechanism, and components of the intensifier mechanism, can be formed using any suitable manufacturing process. For example, bodies 32 can be manufactured using an additive manufacturing process. Additive manufacturing processes generally involve the buildup of one or more materials to make a net or near net shape object, in contrast to more conventional, subtractive manufacturing methods. Though "additive manufacturing" is an industry standard term (ISO/ASTM52900), additive manufacturing encompasses various manufacturing and prototyping techniques known under a variety of names, including freeform fabrication, 3D printing, rapid prototyping/tooling, etc. Additive manufacturing techniques are capable of fabricating complex components and tools, such as an intensifier mechanism, from a wide variety of materials, such as metals and plastics.

In addition, in the exemplary embodiment, system 10 further includes a liner 36 extending between intensifier mechanism 14 and stacked material 12. Liner 36 inhibits intensifier mechanism 14 and membrane 20 contacting stacked material 12. Liner 36 is coupled to side wall 26 and maintained in tension to facilitate forming stacked material 12. In particular, liner 36 reduces indentations and irregularities in stacked material 12 when intensifier mechanism 14 induces a force in stacked material 12. Moreover, liner 36 facilitates removal of formed stacked material 12 from system 10 and reduces deterioration and contamination of system 10. In some embodiments, liner 36 is a release film. In further embodiments, liner 36 is a polypropylene material. In alternative embodiments, system 10 includes any liner 36 that enables system 10 to operate as described herein. For example, in some embodiments, intensifier mechanism 14 is semi-rigid and liner 36 is positioned above intensifier mechanism 14 and stacked material 12. In further embodiments, liner 36 is coupled to any of stacked material 12, intensifier mechanism 14, and membrane 20 that enable system 10 to operate as described herein.

Figure 3:
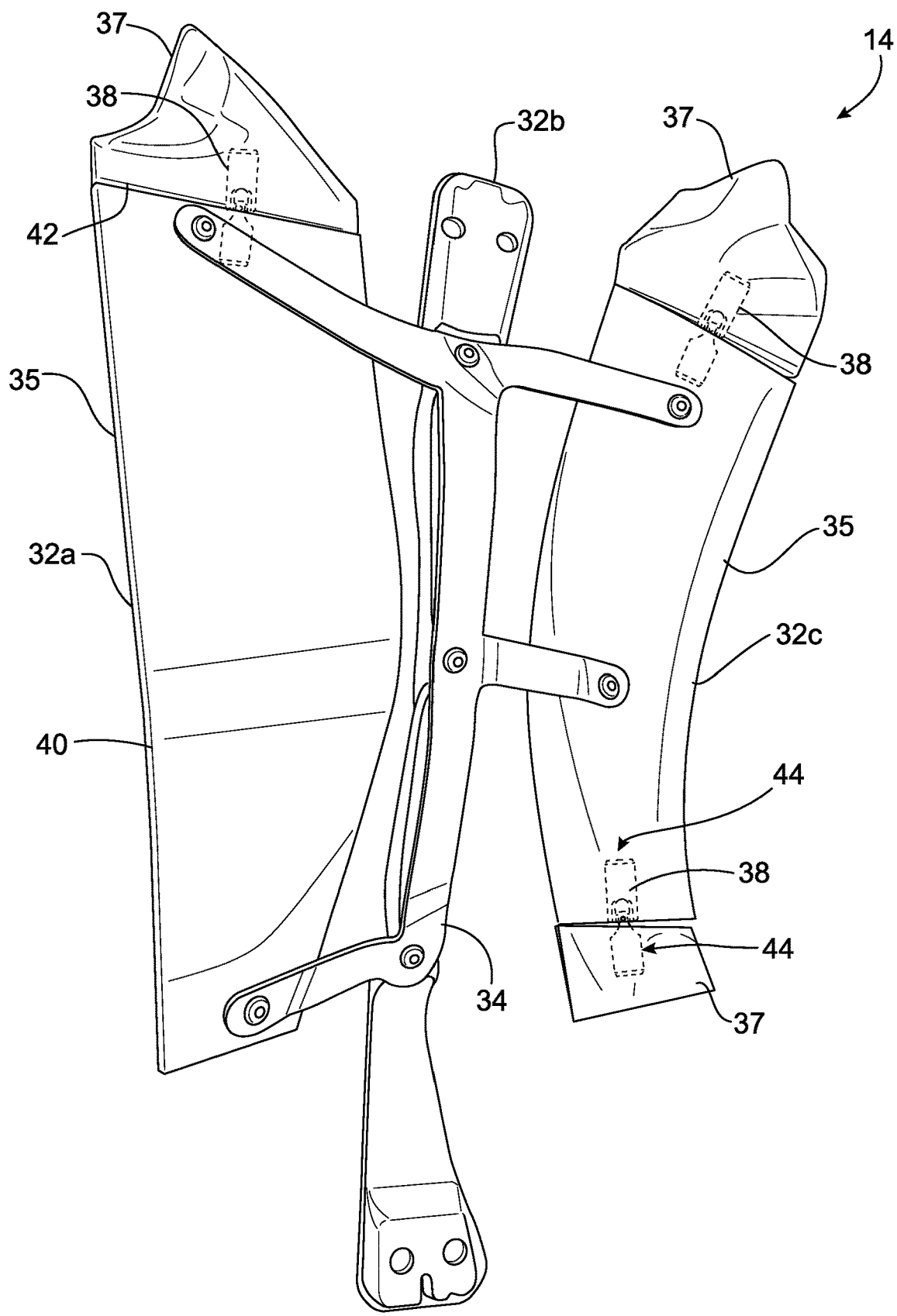
FIG. 3 is a bottom view of an intensifier mechanism, according to one example embodiment.
Figure 4:
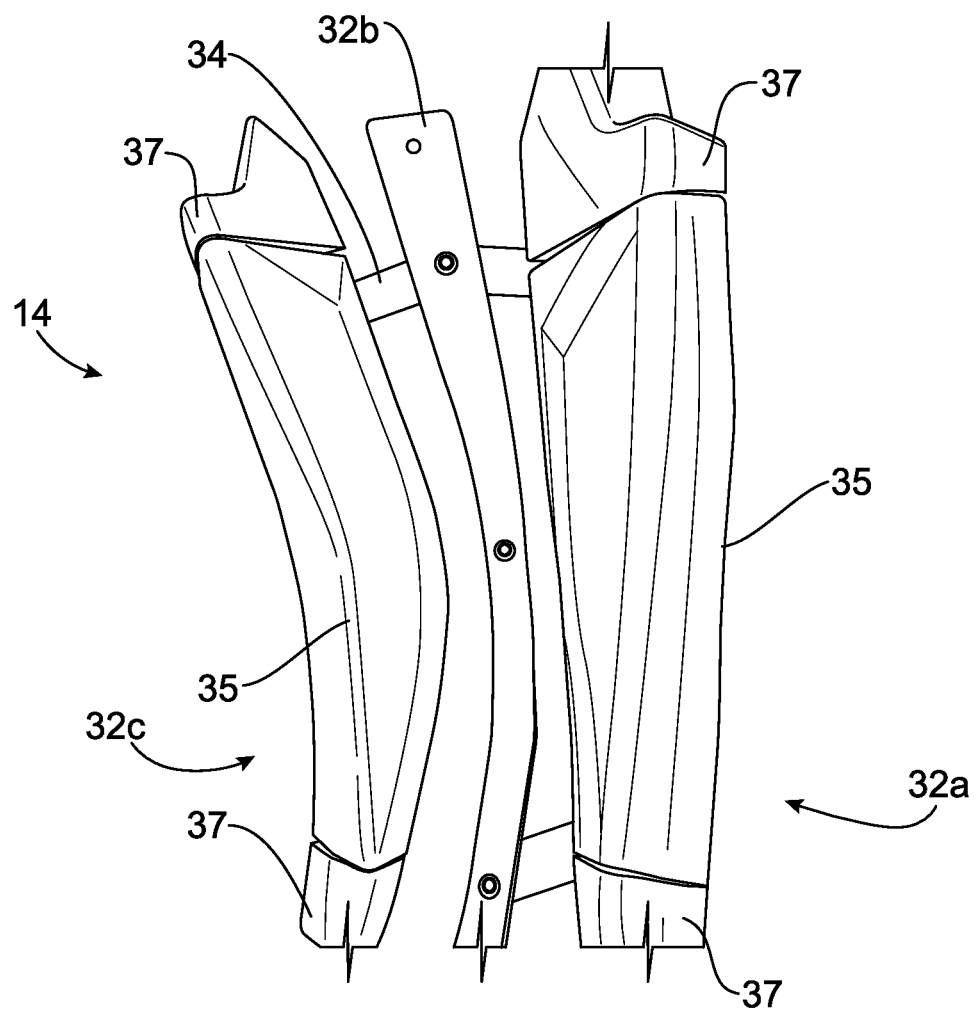
FIG. 4 is a top view of an intensifier mechanism, according to one example embodiment.

Now referring also to FIG. 3, a bottom view of an intensifier mechanism 14, according to one example, and FIG. 4, a top view of an intensifier mechanism 14, according to another example embodiment, is depicted. An intensifier mechanism 14 can include more than one body 32. In both examples, the intensifier mechanism 14 has three bodies 32a, 32b, and 32c. One or more of the bodies 32 can include a main portion 35 and at least one pivoting portion 37. In the FIG. 3 example, body 32a has a main portion 35 and one pivoting portions 37; body 32c has a main portion 35 and two pivoting portions 37. However, it should be understood that each body can have a various number of pivoting portions 37. For example, each body 32 can have one, three, or more pivoting portions 37. In the example of FIG. 4, both body 32a and body 32c each have two pivoting portions 37.

Additionally, the pivoting portions 37 can be located anywhere on body 32 and do not necessarily need to be at an end of the main portion 35, as depicted. For example, a pivoting portion 37 can be on the long edge 40 of a corresponding main portion 35, as opposed to being located on a short edge 42 of the corresponding main portion 35, as shown. Additionally, more than one pivoting portion 37 can be located on each edge of the corresponding main portion 35. For example, the long edge 40 could include one, two, three, or more pivoting portions 37. Each pivoting portion 37 can be movably coupled to the corresponding main portion 35. In these examples, each pivoting portion 37 is movably coupled to the corresponding main portion 35 with a joint 38, as seen in FIG. 3, that allows the pivoting portions 37 to pivot in relation to the corresponding main portion 35 when the membrane 20 moves towards the bottom wall 24.

Figure 5:
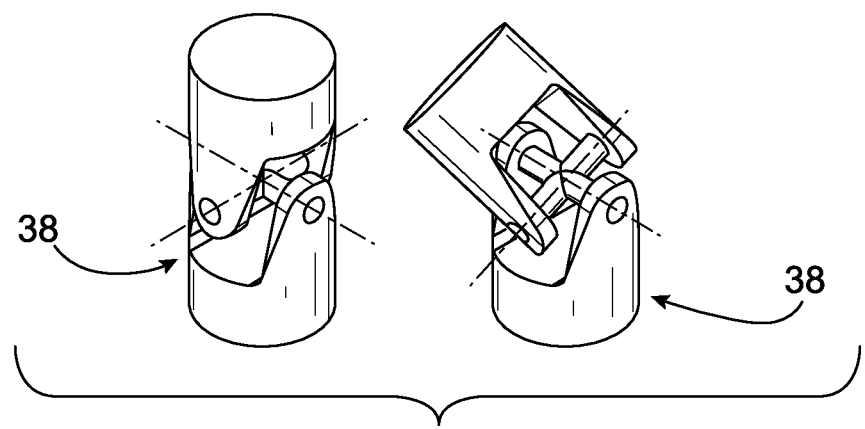
FIG. 5 is a perspective view of a joint, according to one example embodiment.

Now referring also to FIG. 5, a joint 38 according to one example embodiment can be seen. Each joint 38 can be used to allow each pivoting portion 37 to pivot in relation to the corresponding main portion 35. Joint 38 can be any type of joint that allows relative rotation about one or more axes. For example, joint 38 can be a universal joint, as shown in FIG. 5, that allows relative rotation about two axes. Even though the joint 38 of FIG. 5 is shown as a pin and block universal joint, joint 38 can be any type of universal joint, such as a needle bearing, ball and socket, or geared joint.

Additionally, in other example embodiments, each joint 38 may not be a universal joint and could instead be a pin joint, prismatic joint, knuckle joint, turnbuckle, or any other type of joint that would allow relative rotation about one or more axes. Also, it is not necessary for each joint 38 of intensifier mechanism 14 to be of the same type. As just one example, intensifier mechanism 14 could include a pin and block universal joint and a knuckle joint. Of course, each joint 38 could be of the same type. For example, each joint 38 included in the intensifier mechanism 14 could be a universal joint, such as a pin and block universal joint.

Referring back to mainly FIG. 3, each joint 38 can be disposed within an orifice 44 of a main portion 35 and an orifice 44 of pivoting portion 37. As mentioned, intensifier mechanism 14 could be additively manufactured. As such, the orifices 44 could be formed into each main portion 35 and the pivoting portion 37 during the buildup process of the additive manufacturing process. When intensifier mechanism 14 is manufactured with a subtractive manufacturing method, orifices 44 could be machined into each main portion 35 and pivoting portion 37. Once the orifices 44 are formed into the one or more main portions 35 or pivoting portions 37, either with machining or during the additive manufacturing process, each joint 38 can be firmly fixed at least partially within each orifice 44. For example, adhesive could be used to firmly fix the joints 38 into each orifice 44.

Figure 10:
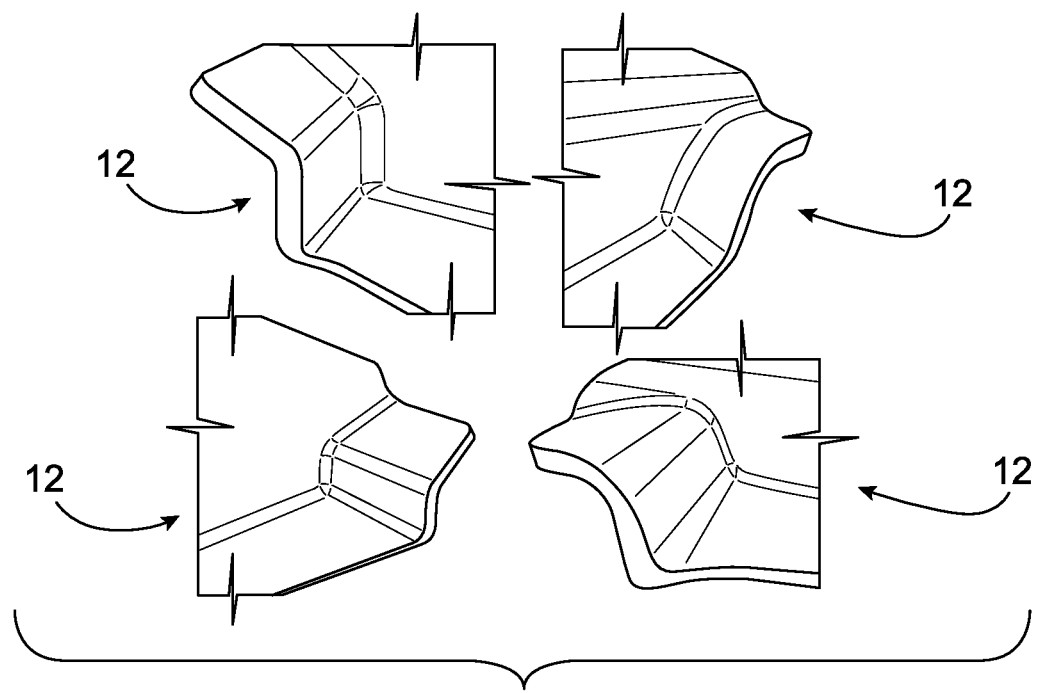
FIG. 10 is a perspective view of formed stacked material, according to several example embodiments.

Incorporating joints 38 and pivoting portions 37 into the intensifier mechanism has many benefits. For example, allowing each of the pivoting portions 37 to pivot in relation to the main portions 35 allows or enhances the forming of more complex geometries, such as undercuts and exterior and interior corners or edges. With the use of intensifier mechanism, it can be unnecessary to layup the layers of material to form these complex geometries. As such, decreased cycle time and labor costs can be realized to form complex geometries with the use of intensifier mechanism 14. Some examples of complex geometries that can be formed in stacked material 12 with the use of intensifier mechanism 14 can be seen in FIG. 10.

One or more components of intensifier mechanism 14, such as one or more main portions and/or one or more pivoting portions 37, can be fabricated such that they are hollow when fabricated using an additive manufacturing process. Making components of intensifier mechanism 14 hollow has several advantages, such as allowing the intensifier mechanism 14 to heat up quicker than if intensifier mechanism 14 was a solid piece of material. Allowing the intensifier mechanism 14 to heat up quicker can be especially beneficial when the one or more main portions 35 and pivoting portions 37 are made from a metal, such as an aluminum alloy, due to its high specific heat. Additionally, making the components hollow reduces the mass of the component and reduces the amount of energy and time required to raise its temperature. This reduction in heating time reduces a thermal mismatch between the body 32 and tool 18 that can lead to wrinkles or malformation of stacked material 12.

Figure 6:
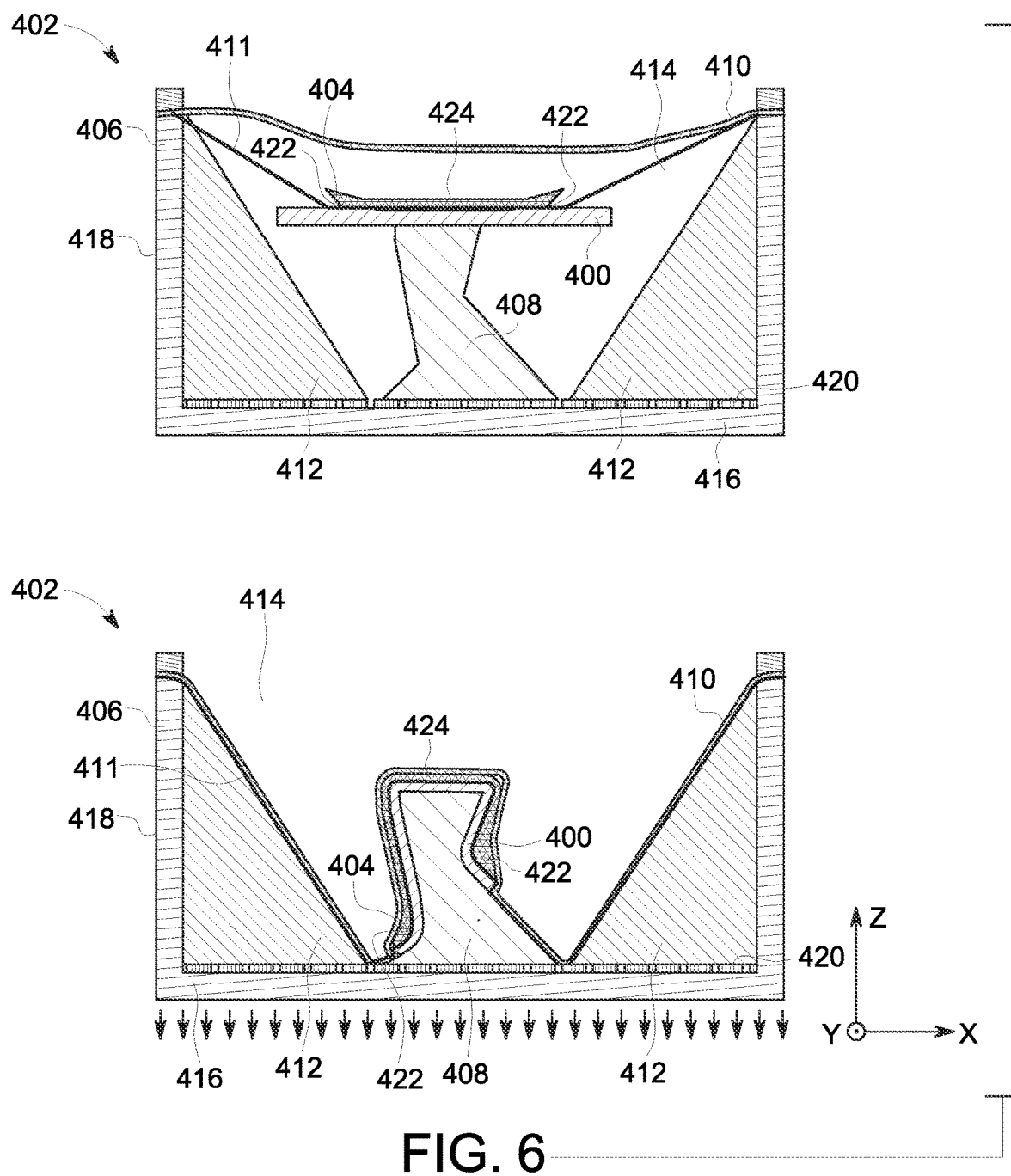
FIG. 6 is a schematic side view of a sequence for forming stacked material, according to one example embodiment.

FIG. 6 is a schematic diagram of a sequence for forming stacked material 400 using a system 402 including an intensifier mechanism 404 positioned on stacked materials 400. Intensifier mechanism 404 can be the same or similar to the intensifier mechanism 14, as described above, which can include one or more bodies 32 that can have one or more pivoting portions 37 that pivot in relation to a main portion 35.

FIG. 6 includes an X-axis, a Y-axis, and a Z-axis for reference during the following description. System 402 includes intensifier mechanisms 404, a housing 406, a tool 408, a membrane 410, a liner 411, and inserts 412. Housing 406 defines an interior space 414 and includes a bottom wall 416, a side wall 418 coupled to bottom wall 416, and a perforated plate 420 disposed on bottom wall 416.

Intensifier mechanism 404 is positioned on stacked material 400 adjacent tool 408 such that intensifier mechanism 404 induces a force in stacked material 400 as membrane 410 moves towards bottom wall 416. In some embodiments, liner 411 is positioned between intensifier mechanism 404 and stacked material 400. In the exemplary embodiment, intensifier mechanism 404 includes a plurality of bodies 422 and a support 424 coupling bodies 422 together. In particular, intensifier mechanism 404 includes two bodies 422 that each correspond to a shape of a portion of tool 408. Each body 422 can include a main portion 35 and one or more pivoting portions 37, as described above. Support 424 is flexible and facilitates positioning intensifier mechanism 404 as membrane 410 moves towards bottom wall 416. In particular, intensifier mechanism 404 is positioned adjacent tool 408 such that bodies 422 induce forces in stacked material 400 and the portions of tool 408 with shapes corresponding to intensifier mechanism 404. Even more specifically, intensifier mechanism 404 is positioned adjacent tool 408 such that the main portion 35 and the one or more pivoting portions 37 of each body 422 induce forces in stacked material 400 and the portions of tool 408 with shapes corresponding to intensifier mechanism 404. In alternative embodiments, intensifier mechanism 404 has any configuration that enables system 402 to operate as described herein. For example, in some embodiments, intensifier mechanism 404 includes one body 422. In further embodiments, intensifier mechanism 404 includes a plurality of bodies 422 that are not coupled together by support 424. In some examples, each body includes one or more pivoting portions 37 movably coupled to a main portion 35 with a joint 38.

Figure 7:
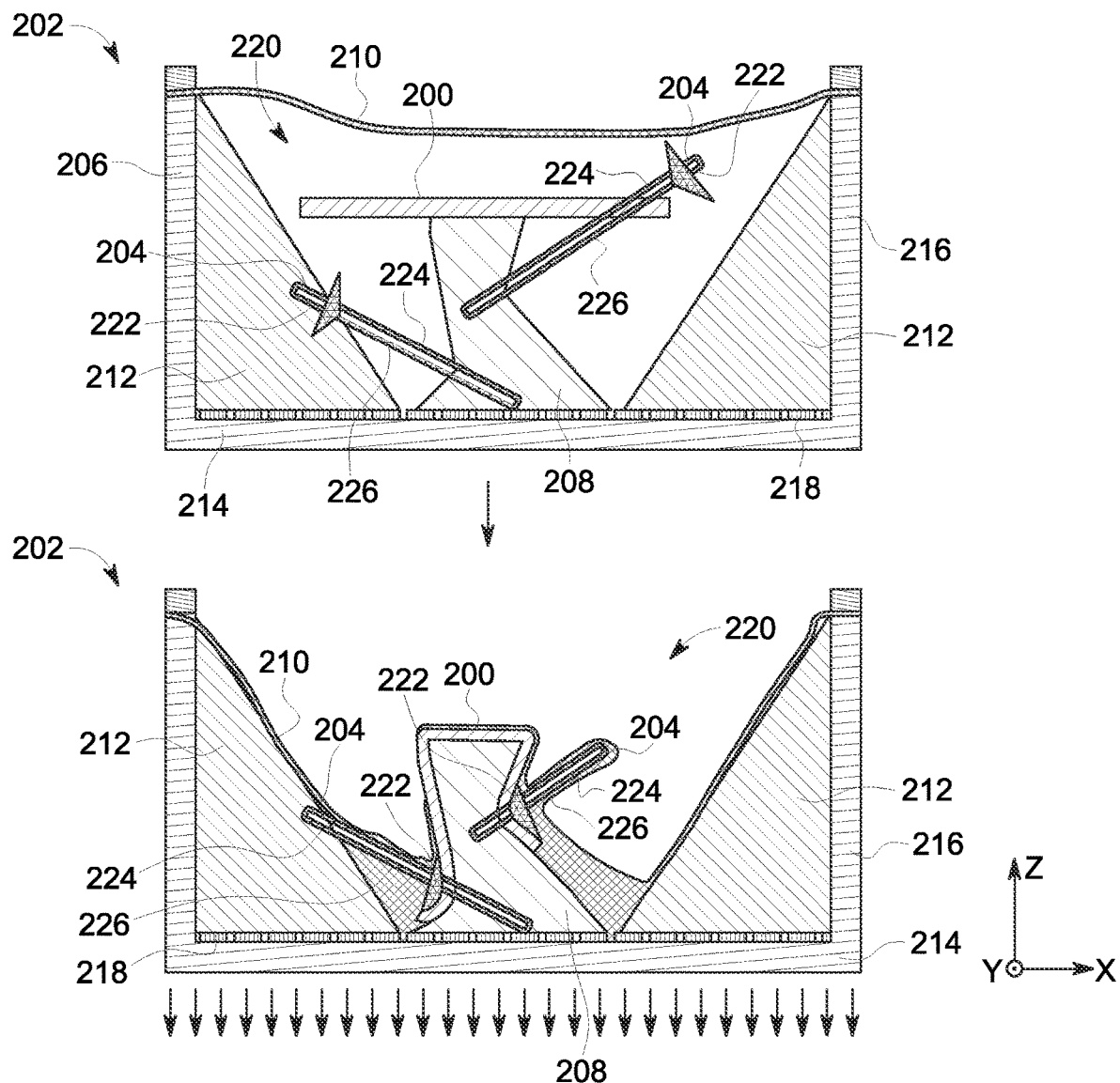
FIG. 7 is schematic side view of a sequence for forming stacked material, according to one example embodiment.
Figure 8:
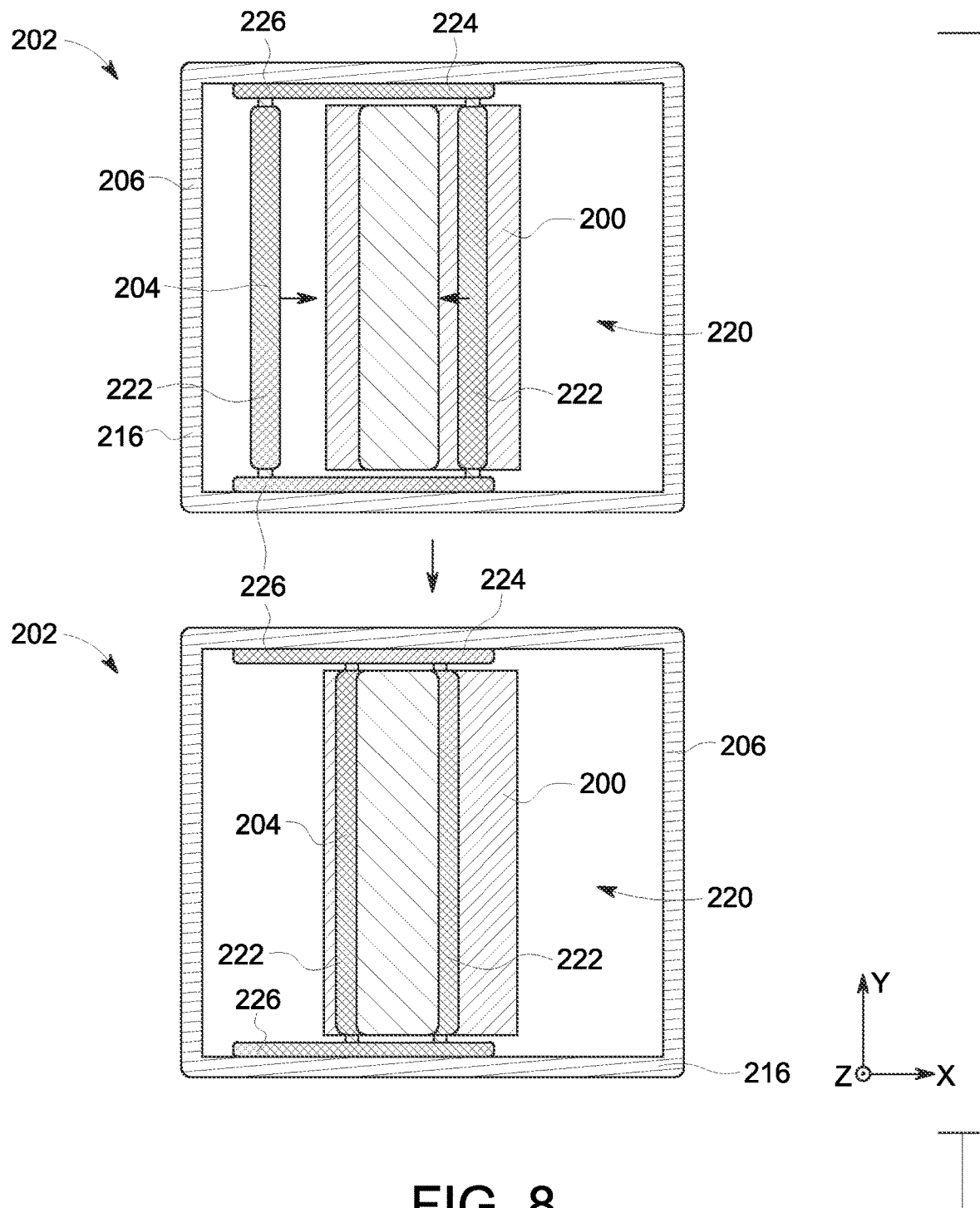
FIG. 8 is a schematic top view of a sequence for forming stacked material using the system shown in FIG. 7, according to one example embodiment.

FIG. 7 is a schematic side view of a sequence of forming stacked material 200 using a system 202 including intensifier mechanisms 204. Intensifier mechanism 204 can be the same or similar to the intensifier mechanism 14, as described above, which can include one or more bodies 32 that can have one or more pivoting portions 37 that pivot in relation to a main portion 35. FIG. 7 includes an X-axis, a Y-axis, and a Z-axis for reference during the following description. FIG. 8 is a schematic top view of a sequence of forming stacked materials using system 202. FIG. 8 includes an X-axis, a Y-axis, and a Z-axis for reference during the following description. System 202 includes intensifier mechanisms 204, a housing 206, a tool 208, a membrane 210, and inserts 212. Housing 206 includes a bottom wall 214, a side wall 216 coupled to bottom wall 214, and a perforated plate 218 disposed on bottom wall 214. Housing 206 defines an interior space 220. During operation of system 202, a negative pressure is generated in interior space 220 such that membrane 210 is drawn towards bottom wall 214. As membrane 210 moves towards bottom wall 214, membrane 210 contacts stacked material 200, tool 208, side wall 216, inserts 212, and intensifier mechanisms 204. When membrane 210 contacts intensifier mechanisms 204, intensifier mechanisms 204 move towards tool 208 and stacked material 200. Intensifier mechanisms 204 are configured to press stacked material 200 against tool 208 such that stacked material 200 is compacted. Intensifier mechanisms 204 are configured to extend and move in directions along the X-axis, Z-axis, and Y-axis such that intensifier mechanisms contact stacked material 200 at predetermined locations. In particular, intensifier mechanisms 204 induce a force against a portion of stacked material 200 adjacent complex geometries on tool 208 to facilitate tool 208 shaping stacked material 200. Moreover, intensifier mechanisms 204 limit the amount of stretching of membrane 210.

Intensifier mechanisms 204 are disposed in interior space 220 and include a body 222 and a support 224. Support 224 is coupled to housing 206 and body 222 such that body 222 is movable in relation to housing 206. Body 222 can also include a main portion 35, one or more pivoting portions 37 that is movably coupled to main portion, and one or more joints 38, as described above. In particular, body 222 and support 224 are movably coupled together such that body moves along support 224. Support 224 includes rails 226 coupled to opposed portions of side wall 216. In alternative embodiments, support 224 is coupled to any components of system 202 that enable system 202 to operate as described herein. In the exemplary embodiment, rails 226 are angled along side wall 216 such that body 222 moves in directions along both the X-axis and the Z-axis. Body 222 extends between rails 226 and has a shape that corresponds to a desired shape of a component formed from stacked material 12 and engages a portion of tool 208. In alternative embodiments, intensifier mechanisms 204 have any configuration that enables system 202 to operate as described herein. For example, in some embodiments, intensifier mechanisms 204 are positioned on the side of membrane 210 exterior to interior space 220 and compress membrane 210 and stacked material 200 against tool 208. In further embodiments, intensifier mechanisms 204 are integrated into and/or coupled to tool 208 and/or membrane 210.

In the exemplary embodiment, support 224 includes two rails 226 that are parallel. In some embodiments, support 224 includes any number of rails 226, including one, that enable system 202 to operate as described herein. In further embodiments, support 224 includes a plurality of rails 226 and at least two rails of the plurality of rails 226 are not parallel. For example, in some embodiments, body 222 has an asymmetric shape such that body 222 extends between rails 226 that are not parallel.

Also, in the exemplary embodiment, intensifier mechanisms 204 are positionable between multiple positions. In particular, intensifier mechanisms 204 move from a position spaced from tool 106 and stacked material 200 to a position where intensifier mechanisms contact stacked material 200 to press stacked material 200 against tool 208 at a desired pressure. For example, in a first position, intensifier mechanisms 204 do not exert a substantial force against stacked material 200. In a second position, intensifier mechanisms 204 cause compaction of stacked material 200. In alternative embodiments, intensifier mechanisms 204 are positionable in any positions that enable system 202 to operate as described herein. In some embodiments, intensifier mechanisms 204 include biasing mechanisms, such as springs, to facilitate movement of intensifier mechanisms 204.

Figure 9:
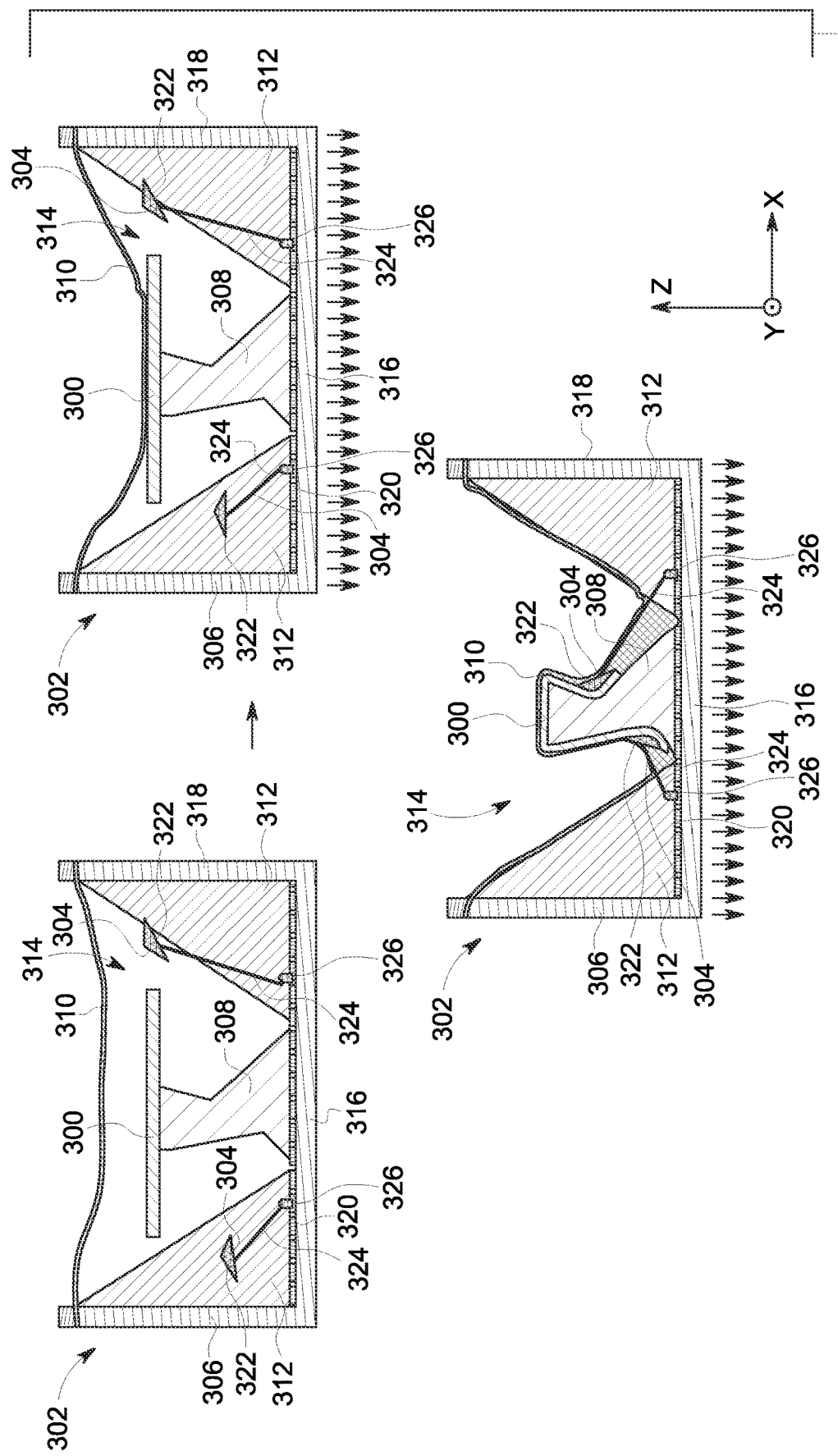
FIG. 9 is a schematic side view of a sequence for forming stacked material, according to one example embodiment.

FIG. 9 is a schematic diagram of a sequence of forming stacked material 300 using a system 302 including intensifier mechanisms 304. Intensifier mechanism 304 can be the same or similar to the intensifier mechanism 14, as described above, which can include one or more bodies 32 that can have one or more pivoting portions 37 that pivot in relation to a main portion 35. FIG. 9 includes an X-axis, a Y-axis, and a Z-axis for reference during the following description. System 302 includes intensifier mechanisms 304, which can be the same or similar to the intensifier mechanisms 14 of FIG. 3 or FIG. 4, a housing 306, a tool 308, a membrane 310, and inserts 312. Housing 306 defines an interior space 314 and includes a bottom wall 316, a side wall 318 coupled to bottom wall 316, and a perforated plate 320 disposed on bottom wall 316.

Intensifier mechanisms 304 include bodies 322 and a support 324. Support 324 is movably coupled to bottom wall 316 at a joint 326 such that intensifier mechanism 304 rotates about joint 326. In addition, support 324 is rotatably coupled to bodies 322 to facilitate bodies 322 rotating to contact stacked material 300 on tool 308. Intensifier mechanism 304 is configured such that body 222 moves in directions along both the X-axis and the Z-axis. Bodies 322 are shaped to correspond to a shape of tool 308. In some embodiments, intensifier mechanisms 304 and tool 308 are shaped to form corresponding male and female components. In alternative embodiments, intensifier mechanisms 304 have any configuration that enables system 100 to operate as described herein.

In the exemplary embodiments, a temperature control unit (not shown) can be provided that maintains the interior space 30, 220, 314, 414 and stacked material 12, 200, 300, 400 at a desired temperature during operation of systems 10, 202, 302, 402. In some embodiments, the temperature control unit includes a heating and/or cooling source to increase and/or decrease the temperature of interior space 30, 220, 314, 414 and, thereby, control the pliability of stacked material 12, 200, 300, 400. The heating and/or cooling source is disposed inside of housing 16, 206, 306, 406, disposed outside of housing 16, 206, 306, 406, and/or integrated into housing 16, 206, 306, 406. In alternative embodiments, tool 18, 208, 308, 408 is maintained at a desired temperature by the temperature control unit and a heating and/or cooling source. In further embodiments, temperature control unit includes a temperature controlled enclosure, such as an oven or a cooler, and housing 16, 206, 306, 406 is positioned at least partially within the temperature controlled enclosure. In alternative embodiments, temperature control unit has any configuration that enables system 10, 202, 302, 402 to operate as described herein.

Moreover, in the exemplary embodiments, a controller (not shown) can be provided that controls a vacuum source to control movement of membrane 20, 210, 310, 410. In some embodiments, the controller controls any components of system 10, 202, 302, 402 to facilitate the automation of the forming process. For example, in some embodiments, the controller controls a positioning member (not shown) to position stacked material 12, 200, 300, 400 on tool 18, 208, 308, 408. In addition, in some embodiments, the controller controls the positioning of intensifier mechanism 14, 204, 304, 404. In alternative embodiments, the controller 112 has any configuration that enables system 10, 202, 302, 402 to operate as described herein.

The above described systems include a membrane to facilitate forming stacked material into a component. The system includes a housing defining an interior space and a tool disposed in the interior space. The membrane is moved in the interior space towards the tool. In some embodiments, at least one insert is disposed in the interior space to control movement of the membrane and reduce stretching of the membrane. In further embodiments, at least one intensifier mechanism is disposed in the interior space to facilitate shaping the stacked material with the tool. The at least one intensifier mechanism is configured to cause the tool to shape the component into complex geometries. In some embodiments, the at least one intensifier mechanism provides contact pressure between the stacked material and the tool for increased compaction of the stacked material.

An exemplary technical effect of the methods, systems, and apparatus described herein includes at least one of: (a) increasing operating efficiency of systems for forming stacked materials; (b) enabling components formed from stacked materials to have complex geometries; (c) reducing the cost of forming stacked materials; (d) increasing the reliability of systems for forming stacked materials; (e) enabling stacked materials to be debulked during formation; (f) reducing cost and time required to form stacked materials; and (g) simplifying the forming process for stacked materials.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of systems for forming stacked materials are described above in detail. The systems, and methods of operating and manufacturing such systems are not limited to the specific embodiments described herein, but rather, components of systems and/or steps of the methods may be utilized independently and separately from other components and/or steps described herein. For example, the methods may also be used in combination with other forming systems, and are not limited to practice with only systems, and methods as described herein. Rather, the exemplary embodiment can be implemented and utilized in connection with many other applications for forming materials.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Further aspects of the invention are provided by the subject matter of the following clauses:

1. A system for forming stacked material, the system comprising a housing defining an interior space and comprising a bottom wall and a side wall coupled to the bottom wall; a tool configured to shape the stacked material, the tool disposed within the interior space; a membrane extending at least partially over the bottom wall and spaced a distance from the bottom wall, the membrane configured to move towards the bottom wall; and an intensifier mechanism disposed in the interior space and configured to induce a force against a portion of the stacked material and against the tool as the membrane is moved towards the bottom wall; wherein the intensifier mechanism comprises: a support; a first body coupled to the support; a second body having a main portion, a pivoting portion, and a joint, the main portion being coupled to the support, the joint movably coupling the main portion to the pivoting portion; wherein the joint is configured to allow the pivoting portion to pivot in relation to the main portion when the membrane moves towards the bottom wall.

2. The system of any preceding clause, wherein the main portion and the pivoting portion of the second body each define an orifice, the joint being disposed within both orifices.

3. The system of any preceding clause, wherein the support is configured to bend when the membrane moves towards the bottom wall such that the support forms a hinge that allows the second body to pivot in relation to the first body.

4. The system of any preceding clause, wherein the tool is configured to support the stacked material, and the second body of the intensifier mechanism is configured to move between a first position spaced from the tool and a second position where the intensifier mechanism induces a force against a portion of the stacked material and against the tool.

5. The system of any preceding clause, wherein the main portion and the pivoting portion each have a shape that corresponds to a desired shape of a component formed from the stacked material.

6. The system of any preceding clause, wherein the joint is a universal joint that allows relative rotation between the main portion and the pivoting portion of the second body around two axes.

7. The system of any preceding clause, wherein the support is a unitary component.

8. The system of any preceding clause, wherein the main portion and the pivoting portion of the second body are additively manufactured.

9. The system of any preceding clause, wherein the main portion of the second body is hollow.

10. An intensifier mechanism for forming stacked material, the intensifier mechanism comprising a support; a first body coupled to the support; a second body having a main portion, a pivoting portion, and a joint, the main portion being coupled to the support, the joint movably coupling the main portion to the pivoting portion; wherein the joint is configured to allow the pivoting portion to pivot in relation to the main portion when a downward force is exerted on the intensifier mechanism.

11. The intensifier mechanism of any preceding clause, wherein the support is configured to bend such that the support forms a hinge that allows the second body to pivot in relation to the first body when a downward force is exerted on the intensifier mechanism.

12. The intensifier mechanism of any preceding clause, wherein the main portion and the pivoting portion of the second body are additively manufactured.

13. The intensifier mechanism of any preceding clause, wherein the joint is a universal joint that allows relative rotation between the main portion and the pivoting portion of the second body around two axes.

14. The intensifier mechanism of any preceding clause, wherein the main portion of the second body is hollow.

15. A method of forming stacked material, the method comprising placing stacked material between a tool disposed in an interior space of a housing and a membrane; placing an intensifier mechanism between the stacked material and the membrane, the intensifier mechanism comprising a support; a first body coupled to the support; and a second body having a main portion, a pivoting portion, and a joint, the main portion being coupled to the support, the joint movably coupling the main portion to the pivoting portion; moving the membrane towards the tool; wherein moving the membrane towards the tool causes the pivoting portion to pivot in relation to the main portion, which compresses the stacked material at predetermined locations.

16. The method of any preceding clause, comprising: generating a vacuum force to facilitate moving the membrane towards the tool; and maintaining the stacked material at a desired temperature to facilitate forming the stacked material using the tool.

17. The method of any preceding clause, wherein moving the membrane towards the tool causes the support to bend.

18. The method of any preceding clause, wherein moving the membrane towards the tool causes the intensifier mechanism to induce a force against a portion of the stacked material and against the tool.

19. The method of any preceding clause, wherein moving the membrane towards the tool causes the main portion and the pivoting portion to each shape the stacked material to a corresponding shape.

20. The method of any preceding clause, wherein moving the membrane towards the tool causes the main portion and the pivoting portion to pivot in relation to each other along two different axes.

What is claimed is:

1. A system for forming stacked material, the system comprising:
    a housing defining an interior space and comprising a bottom wall and a side wall coupled to the bottom wall;
    a tool configured to shape the stacked material, the tool disposed within the interior space;
    a membrane extending at least partially over the bottom wall and spaced a distance from the bottom wall, the membrane configured to move towards the bottom wall; and
    an intensifier mechanism disposed in the interior space and configured to induce a force against a portion of the stacked material and against the tool as the membrane is moved towards the bottom wall,
    wherein the intensifier mechanism comprises:
        a support;
        a first body coupled to the support; and
        a second body having a main portion, a pivoting portion, and a joint, the main portion being coupled to the support, the joint movably coupling the main portion to the pivoting portion, and
    wherein the joint is configured to allow the pivoting portion to pivot in relation to the main portion when the membrane moves towards the bottom wall, and wherein the joint is a universal joint that allows relative rotation between the main portion and the pivoting portion of the second body around two axes.

2. The system of claim 1, wherein the main portion and the pivoting portion of the second body each define an orifice, the joint being disposed within both orifices.

3. The system of claim 1, wherein the support is configured to bend when the membrane moves towards the bottom wall such that the support forms a hinge that allows the second body to pivot in relation to the first body.

4. The system of claim 1, wherein the tool is configured to support the stacked material, and the second body of the intensifier mechanism is configured to move between a first position spaced from the tool and a second position where the intensifier mechanism induces a force against a portion of the stacked material and against the tool.

5. The system of claim 1, wherein the main portion and the pivoting portion each have a shape that corresponds to a desired shape of a component formed from the stacked material.

6. The system of claim 1, wherein the support is a unitary component.

7. The system of claim 1, wherein the main portion and the pivoting portion of the second body are additively manufactured.

8. The system of claim 1, wherein the main portion of the second body is hollow.

* * * * *